United States Patent
Matsumura et al.

(10) Patent No.: US 9,735,412 B2
(45) Date of Patent: Aug. 15, 2017

(54) RECHARGEABLE BATTERY AND METHOD TO SUPPRESS DENDRITE

(71) Applicant: INTEL CORPORATION, Santa Clara, CA (US)

(72) Inventors: Naoki Matsumura, San Jose, CA (US); Andrew W. Keates, Los Gatos, CA (US)

(73) Assignee: INTEL CORPORATION, Santa Clara, CA (US)

(*) Notice: Subject to any disclaimer, the term of this patent is extended or adjusted under 35 U.S.C. 154(b) by 42 days.

(21) Appl. No.: 14/865,109

(22) Filed: Sep. 25, 2015

(65) Prior Publication Data
US 2017/0092921 A1 Mar. 30, 2017

(51) Int. Cl.
| | | |
|---|---|---|
| *H01M 2/16* | (2006.01) | |
| *H01M 4/131* | (2010.01) | |
| *H01M 4/136* | (2010.01) | |
| *H01M 4/58* | (2010.01) | |
| *H01M 4/505* | (2010.01) | |

(Continued)

(52) U.S. Cl.
CPC ......... *H01M 2/1673* (2013.01); *H01M 4/131* (2013.01); *H01M 4/136* (2013.01); *H01M 4/485* (2013.01); *H01M 4/505* (2013.01); *H01M 4/525* (2013.01); *H01M 4/5825* (2013.01); *H01M 2220/30* (2013.01)

(58) Field of Classification Search
CPC .... H01M 2/1673; H01M 4/131; H01M 4/136; H01M 4/505; H01M 4/525; H01M 4/485; H01M 4/5825; H01M 2220/30
See application file for complete search history.

(56) References Cited

U.S. PATENT DOCUMENTS

| | | | | |
|---|---|---|---|---|
| 2013/0252092 A1* | 9/2013 | Huang | ............ | H01M 4/762 429/211 |
| 2015/0017550 A1* | 1/2015 | Nishimura | ............ | H01M 4/485 429/322 |
| 2015/0295246 A1* | 10/2015 | Son | ............ | H01M 4/80 429/163 |

FOREIGN PATENT DOCUMENTS

| | | |
|---|---|---|
| JP | 08306390 A | 11/1996 |
| JP | 2003132894 A | 5/2003 |
| KR | 100559364 B1 | 3/2006 |

(Continued)

OTHER PUBLICATIONS

PCT/US2016/046179, International Search Report and Written Opinion, Nov. 18, 2016, 14 pages.

*Primary Examiner* — Stewart Fraser
(74) *Attorney, Agent, or Firm* — Stoel Rives LLP

(57) ABSTRACT

A battery cell includes a first current collector, a cathode in electrical contact with the first current collector, and a second current collector. The second current collector includes a metal foam having a porous structure, and an electrically insulating layer on outer surfaces of the porous structure facing the cathode. The electrically insulating layer isolates the outer surfaces facing the cathode from ions provided by the cathode. The electrically insulating layer is configured to allow an electrolyte to transport ions from the cathode to an inner portion of the porous structure of the metal foam. The battery cell may further include a separator to separate the cathode and the first current collector from the second current collector. When the battery cell is in at least a partially charged state, ions form an anode including a metal plating within the inner porous structure of the metal foam.

18 Claims, 5 Drawing Sheets

(51) Int. Cl.
*H01M 4/525* (2010.01)
*H01M 4/485* (2010.01)

(56) References Cited

FOREIGN PATENT DOCUMENTS

| | | |
|---|---|---|
| KR | 100567393 B1 | 4/2006 |
| KR | 1020150030156 A | 3/2015 |
| WO | WO2015037867 A1 * | 3/2015 |

* cited by examiner

RECHARGEABLE BATTERY AND METHOD TO SUPPRESS DENDRITE

TECHNICAL FIELD

This disclosure relates to portable energy sources such as batteries, and more particularly to rechargeable batteries having metal a metal electrode.

BACKGROUND

Electronic devices, including mobile platforms such as smartphones, laptops, notebook computers, and tablet computers, continue to shrink in size. A power delivery system, including one or more battery cells, is often among the largest components of a portable electronic device. As portable electronic devices shrink in size, users also expect that power delivery systems will grow smaller and more portable.

BRIEF DESCRIPTION OF THE DRAWINGS

Arrangements and embodiments may be described in detail with reference to the following drawings, in which like reference numerals refer to like elements, and wherein.

DETAILED DESCRIPTION OF EMBODIMENTS

Figure 1A:
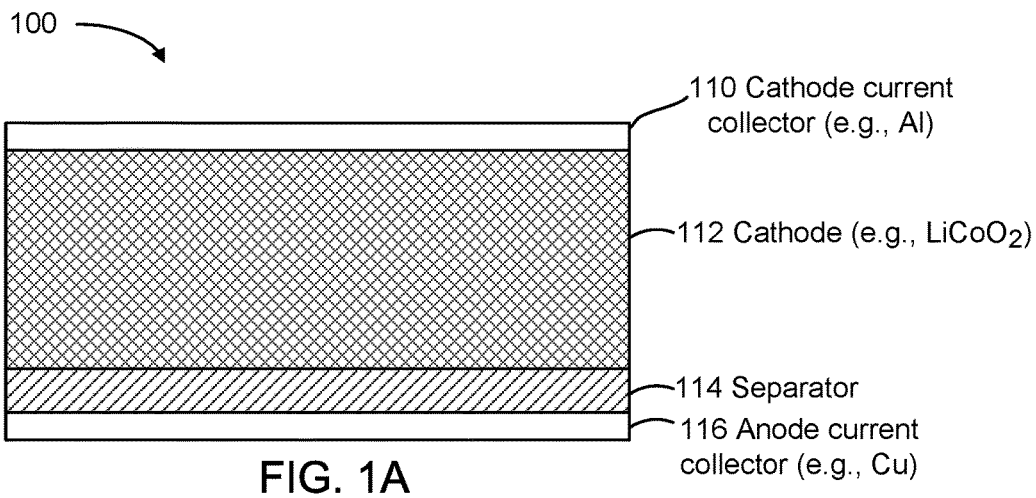
FIGS. 1A and 1B illustrate a cross-section of a metal rechargeable battery cell.

Embodiments and arrangements disclosed herein include a rechargeable battery comprising a metal electrode, which may be referred to herein as a "metal rechargeable battery." In certain embodiments, an electrically conductive foam, such as a metallic foam, is configured as an anode current collector in a metal rechargeable battery cell. As discussed below, the embodiments eliminate or suppress dendrite for safe charging and recharging of the metal rechargeable battery cell. In one embodiment, for example, a conventional copper (Cu) sheet current collector is replaced with a copper foam including an electrically insulating layer on its outer surface. During charging and recharging of the metal rechargeable battery cell, lithium plating grows within the copper foam to form the anode. Unlike conventional lithium-ion (Li-ion) battery cells with copper sheet current collectors, the copper foam with the electrically insulating layer prevents or substantially reduces the likelihood of the lithium plating growing toward the cathode to cause a short circuit.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

Figure 1B:
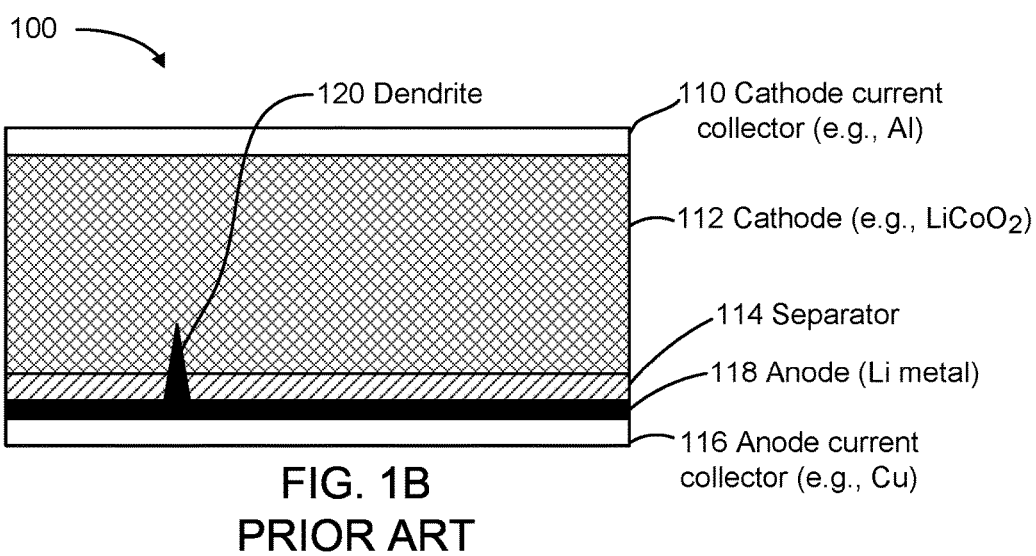

FIGS. 1A and 1B illustrate a cross-section of a metal rechargeable battery cell 100 including a cathode current collector 110, a cathode 112, a separator 114, and an anode current collector 116. In the illustrated example, the cathode current collector 110 comprises an electrically conductive material such as aluminum (Al), the cathode 112 comprises lithium cobalt oxide ($LiCoO_2$), and the anode current collector 116 comprises an electrically conductive material such as copper (Cu). Thus, in this example, the metal rechargeable battery cell 100 is a Li-ion battery cell. In other embodiments, however, a metal other than lithium may be used (e.g., magnesium or tin). The separator 114 may comprise a microporous polymer separator or other material that allows lithium ions to pass (but not electrons) during charging and discharging of the metal rechargeable battery cell 100. Persons skilled in the art will recognize from the disclosure herein that other materials may be used for the cathode current collector 110, the cathode 112, the separator 114, and the anode current collector 114.

FIG. 1A shows an initial or uncharged state of the metal rechargeable battery cell 100, and FIG. 1B shows an example of a charged state of the metal rechargeable battery cell 100. The thickness of the anode layer is reduced in the metal rechargeable battery cell 100 by removing the graphite commonly used to store lithium ions and allowing the lithium to form instead as a thin metal film. For example, FIG. 1B shows an anode 118 (i.e., Li metal) formed on the anode current collector 116 when the metal rechargeable battery cell 100 is charged. This allows for a thinner battery with higher energy density.

However, there are safety concerns using lithium metal anodes, which include internal short circuits due to dendrite 120 generation during charge. The dendrite 120 tends to be produced on the surface of the flat anode current collector 116 and normally precipitates in the form of a needle-like crystal. The dendrite 120 may be easily grown through the separator 114 (i.e., porous membrane). If the dendrite 120 has grown through the separator 114 and has reached the surface of the cathode 112, the metal rechargeable battery cell 100 is short-circuited, and the charge-discharge function is lost. In the worst case, the battery may catch on fire and/or explode. It is likely that such a phenomenon occurs, and reliability deteriorates along with a reduction in thickness of the separator 114 and a reduction in the gap between the cathode 112 and the anode current collector 116.

Figure 2A:
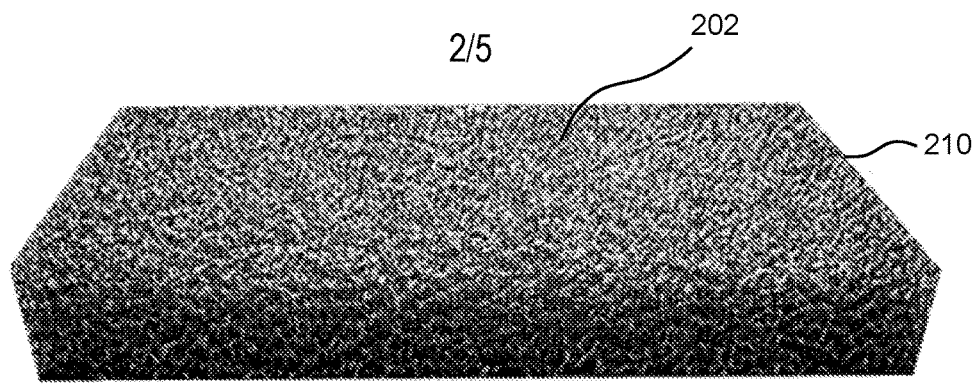
FIG. 2A is a perspective view of a copper foam according to one embodiment.
Figure 2B:
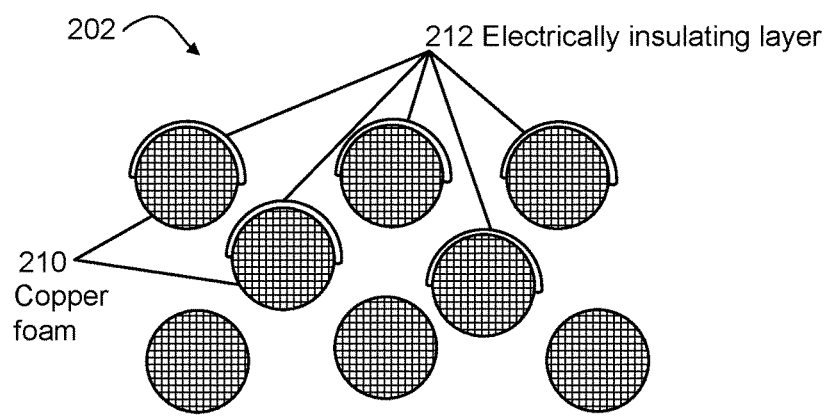
FIGS. 2B and 2C illustrate a simplified cross-section of the outer surfaces of the copper foam according to one embodiment.
Figure 2C:
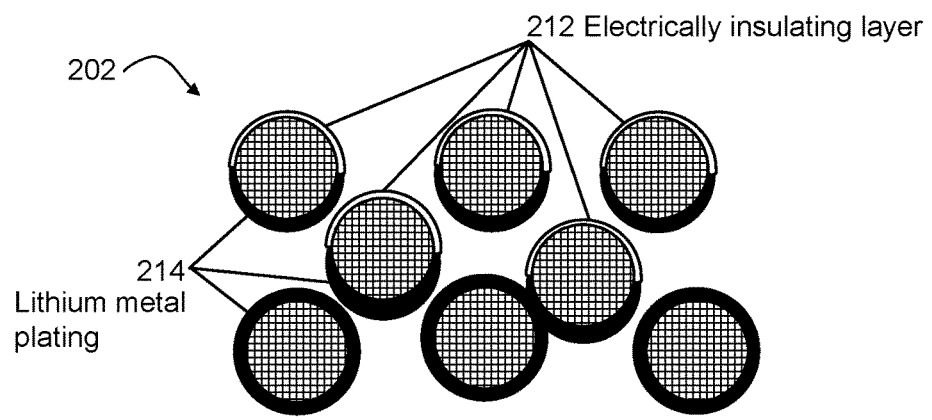

Thus, according to certain embodiments described herein, a metal foam with an electrically insulating layer is used instead of a flat copper sheet. FIG. 2A is a perspective view of a copper foam 210 according to one embodiment. The copper foam 210 has a porous structure that allows an electrolyte to transport ions to an inner portion of the copper foam 210. To prevent dendrite from growing toward the cathode 112, outer surfaces 202 of the porous structure facing the cathode 112 are covered with an electrically insulating layer. For example, FIGS. 2B and 2C illustrate a simplified cross-section side view of the outer surfaces 202 of the copper foam 210 according to one embodiment. An electrically insulating layer 212 covers portions of individual strands of the copper foam 210 that are exposed to or are facing the cathode 112. The electrically insulating layer 212 may be applied, by way of example and not by limitation, spraying, sputter deposition, or other physical vapor deposition process.

The insulating layer 212 does not prevent ions from entering through micro pores into the inner portion of the copper foam 210. Thus, as shown in FIG. 2C, a lithium metal plating 214 forms on the copper surfaces within the inner portion of the copper foam 210 without forming on the outer surfaces covered by the electrically insulating layer 212. Accordingly, because the surfaces facing the cathode 112 are covered, dendrite is prevented from growing, or is much less likely to grow, in the direction of the cathode 112.

Figure 2D:
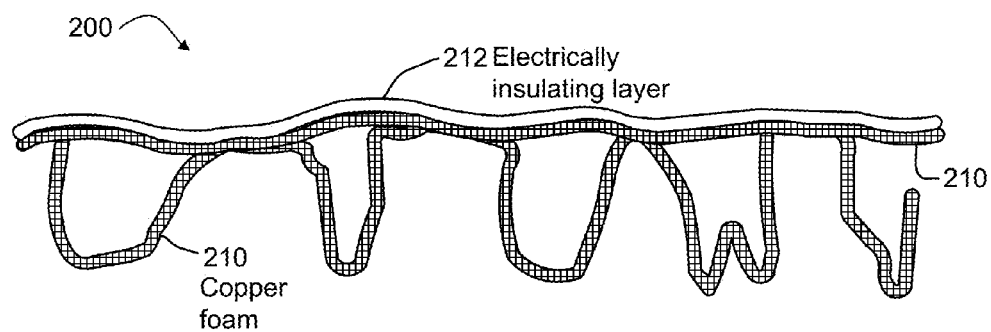
FIGS. 2D and 2E illustrate a cross-section of an anode current collector including the copper foam and an electrically insulating layer shown in FIGS. 2B and 2C according to one embodiment.
Figure 2E:
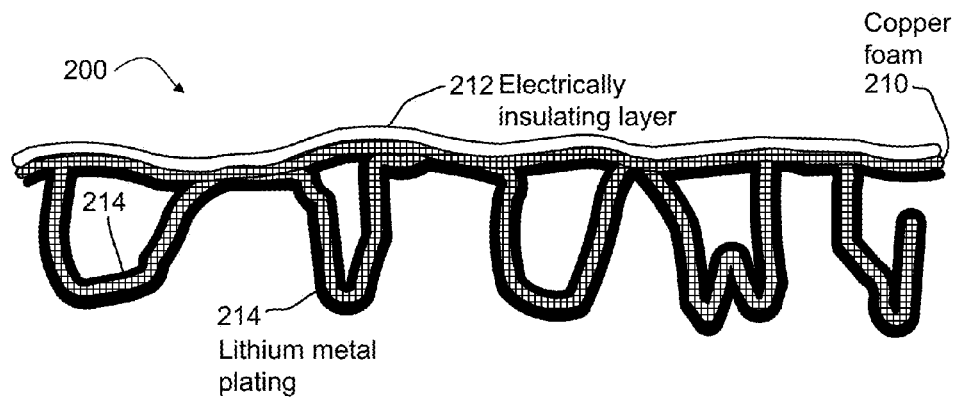

FIGS. 2D and 2E illustrate a cross-section of an anode current collector 200 including the copper foam 210 and the electrically insulating layer 212 according to one embodiment. FIG. 2D shows the anode current collector 200 when a metal rechargeable battery cell, such as the metal rechargeable battery cell 100 shown in FIG. 1A, is in an initial or uncharged state. FIG. 2E shows the anode current collector 200 when the metal rechargeable battery cell is in a charged or charging state.

As discussed above with respect to FIGS. 2B and 2C, the electrically insulating layer 212 leaves micro pores that allow lithium ions to pass from the cathode 112 into the copper foam 210. In the example shown in FIGS. 2D and 2E, the electrically insulating layer 212 is located on the outer surface of the copper foam 210. Thus, during charging, the electrically insulating layer 212 blocks lithium ions from interacting with the outer surface, while allowing the lithium ions into the pore structure of the copper foam 210. As shown in FIG. 2E, the lithium ions form or build on the uncoated inside surfaces of the copper foam 210 to produce lithium metal plating 214 within the foam structure.

The copper foam 210 may comprise porous copper or sponge-shaped copper. While several example embodiments herein use copper (Cu) foam, including the examples shown in FIGS. 2A, 2B, 2C, 2D, 2E, 3, and 4, the present disclosure is not so limited. Indeed, any electrochemically stable metal foam or electrically conductive porous structure may be used in certain embodiments.

Figure 3:
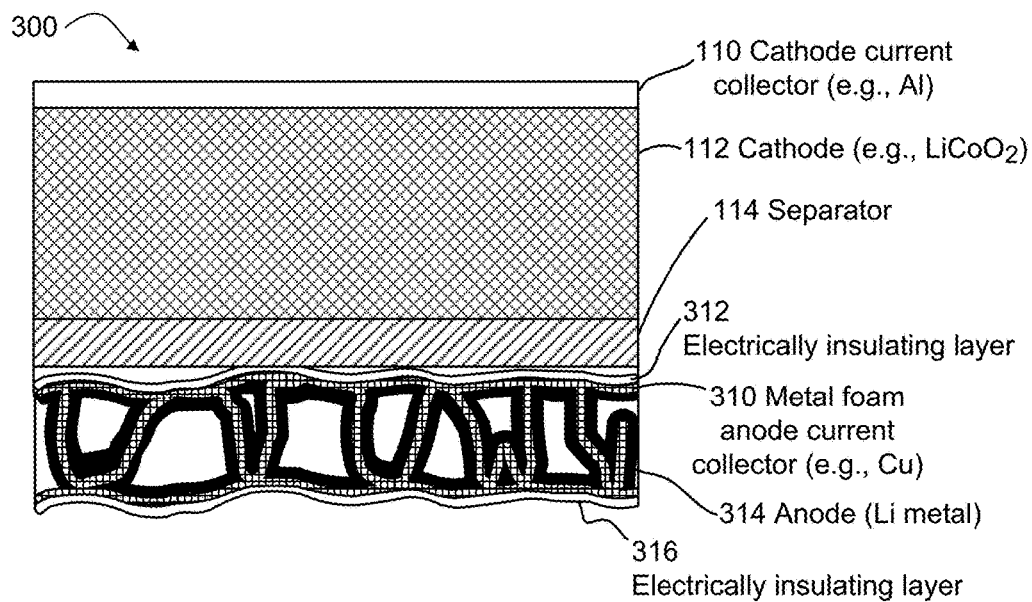
FIG. 3 illustrates a cross-section of a metal rechargeable battery cell including a metal foam anode current collector according to one embodiment.

FIG. 3 illustrates a cross-section of a metal rechargeable battery cell 300 including a metal foam anode current collector 310 according to one embodiment. The metal rechargeable battery cell 300 includes a cathode current collector 110, a cathode 112, and a separator 114, as discussed above with respect to FIGS. 1A and 1B. In this example, the cathode current collector 110 comprises an electrically conductive material such as aluminum (Al). The cathode 112 may comprise, for example, lithium cobalt oxide, lithium nickel oxide, lithium manganese oxide, lithium iron phosphate, lithium titanium oxide or a mixture of some of these chemistries. In other embodiments, however, the cathode 112 comprises a metal other than lithium (e.g., magnesium or tin).

The metal rechargeable battery cell 300 further includes an electrically insulating layer 312 to separate a top surface of the metal foam anode current collector 310 from the separator 114 and the cathode 112. In one embodiment, the metal rechargeable battery cell 300 further includes an electrically insulating layer 316 on a bottom surface of the metal foam anode current collector 310. In another embodiment, the electrically insulating layer 312 and the electrically insulating layer 316 are part of a single electrical insulator material that covers all or most of the metal foam anode current collector 310. The cathode current collector 110 is configured as a positive (+) battery terminal and the metal foam anode current collector 310 is configured as a negative (−) battery terminal of metal rechargeable battery cell 300.

In one embodiment, as shown in FIG. 2D, the electrically insulating layer 212 may first be formed on the outer surface of the copper foam 210, for subsequent integration with battery cell components. In certain embodiments where the electrically insulating layer 312 provides sufficient physical or mechanical separation between the cathode 112 and the metal foam anode current collector 310, the separator 114 is not used.

The metal rechargeable battery cell 300 is shown in a charged or charging state such that an anode 314 comprising lithium metal plating has grown or is growing within the foam structure of the metal foam anode current collector 310. Because the top surface of the foam structure is covered by the electrically insulating layer 312, lithium metal plating is prevented from growing on the top surface of the metal foam anode current collector 310. Thus, even if dendrite were to form within the foam structure, the risk of a short circuit caused by dendrite extending to the cathode 112 or the cathode current collector 110 is eliminated or greatly reduced. The high surface area within the foam structure, as compared to the flat surface of the anode current collector 116 shown in FIG. 1B, forms a thinner layer of lithium metal during charging, which further leads to a reduced likelihood of dendrite formation. The higher surface area also contributes to a higher battery power and an ability to charge and discharge quicker than the embodiment shown in FIGS. 1A and 1B.

Figure 4:
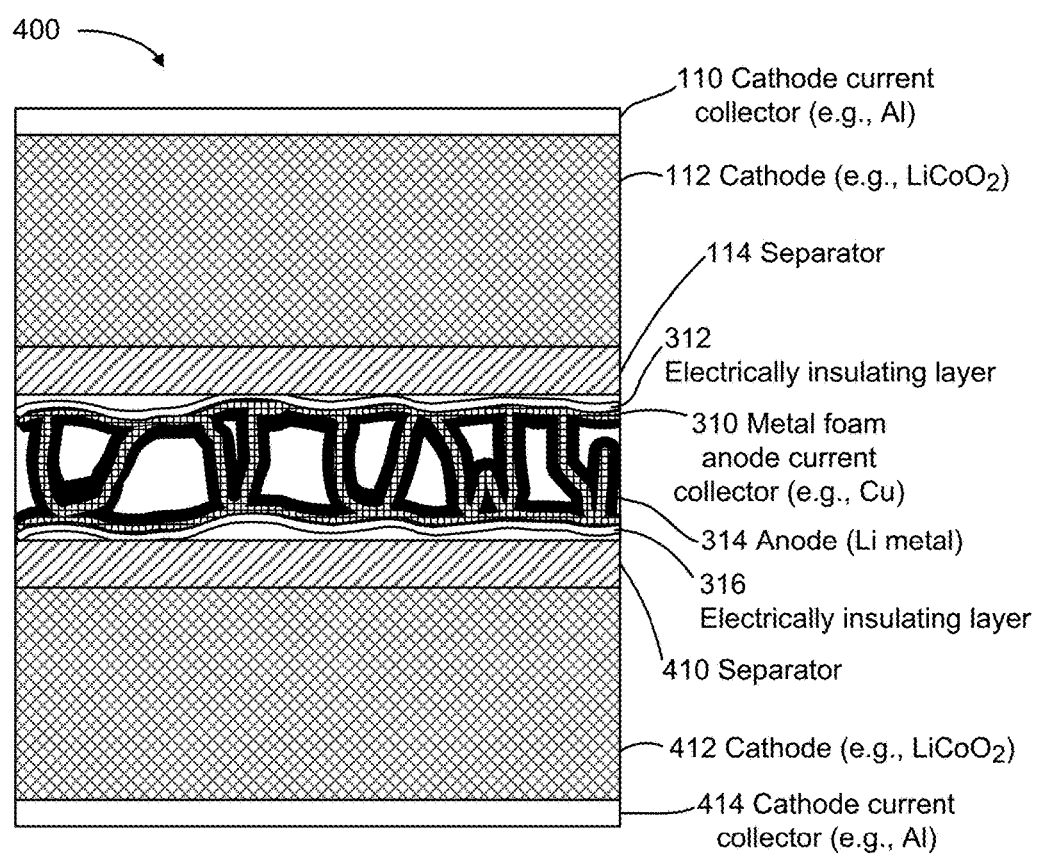
FIG. 4 illustrates a cross-section of a metal rechargeable battery cell including a metal foam anode current collector according to another embodiment.

FIG. 4 illustrates a cross-section of a metal rechargeable battery 400 including a metal foam anode current collector 310 according to another embodiment. In this example, the metal rechargeable battery cell 400 is symmetrical with the metal foam anode current collector 310 forming a center electrode. As with the example shown in FIG. 3, the metal rechargeable battery cell 400 shown in FIG. 4 includes a cathode current collector 110, a cathode 112, a separator 114, and an electrically insulating layer 312 over the metal foam anode current collector 310. The metal rechargeable battery cell 400 further includes an electrically insulating layer 316 attached to a bottom surface of the metal foam anode current collector 310, a separator 410, a cathode 412, and a cathode current collector 414. The operation of the metal rechargeable battery cell 400 is similar to that described with respect to FIG. 3, including preventing or reducing the likelihood of dendrite forming either above or below the outer surfaces of the metal foam anode current collector 310.

Figure 5:
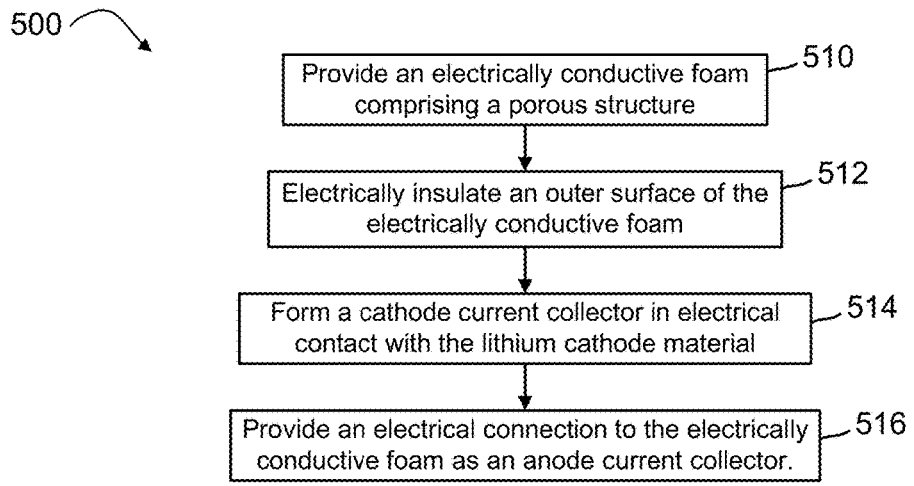
FIG. 5 illustrates a flow chart of a method for manufacturing a metal rechargeable battery according to one embodiment.

FIG. 5 is flow chart of a method 500 for manufacturing a metal rechargeable battery according to one embodiment. The method 500 comprises providing 510 an electrically conductive foam comprising a porous structure, electrically isolating 512 an outer surface of the electrically conductive foam, forming 514 a cathode current collector in electrical contact with the lithium cathode material, and providing 516 an electrical connection to the electrically conductive foam as an anode current collector. The method 500 may further include providing a separator to separate the cathode and the cathode current collector from the electrically conductive foam.

In certain embodiments, insulating the outer surface of the electrically conductive foam includes forming an electrically insulating layer over the outer surface of the electrically conductive foam, and assembling the cell with a separator layer over the electrically insulating layer. In another embodiment, the electrically insulating layer is formed over the electrically conductive foam and is used to mechanically prevent the anode from touching the cathode, such that the electrically insulating layer performs the operation of a separator (and an additional separator layer is not needed). In yet another embodiment, a separator layer is applied to the electrically conductive foam so as to bond to the foam in a way that closes the pores of the insulator layer at the bond interface (e.g., melting onto the foam), and leaving areas that bridge the pores in the foam porous. In such embodiments, the separator layer takes on the role of the electrically insulating layer.

In certain embodiments, providing the electrically conductive foam comprises selecting a material from a group comprising a porous copper and a sponge-shaped copper. The method 500 may further include charging the lithium-ion battery through the cathode current collector and the anode current collector to grow a lithium metal within the porous structure of the electrically conductive foam.

Figure 6:
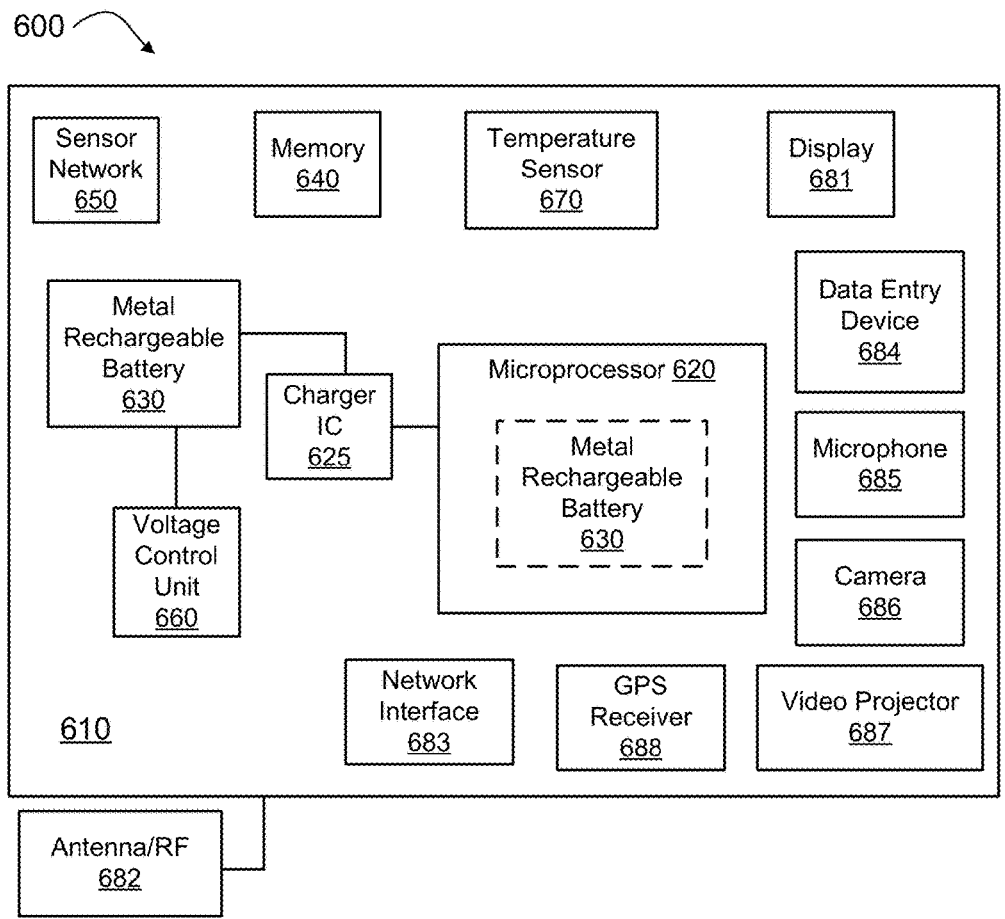
FIG. 6 illustrates a block diagram of a mobile electronic device according to one embodiment.

FIG. 6 illustrates a block diagram of a mobile electronic device 600 according to one embodiment. As illustrated in FIG. 6, the mobile electronic device 600 includes a substrate 610 on which a microprocessor 620 and a metal rechargeable battery 630 associated with microprocessor 620 are disposed. The metal rechargeable battery 630 can either be located on a substrate 610 away from microprocessor 620, as illustrated in solid lines, or it can be located on the microprocessor 620 itself, as illustrated in dashed lines. In one embodiment, the metal rechargeable battery 630 includes an anode current collector comprising an electrically conductive foam, and may comprise for example one of the battery cells shown in FIGS. 3 and 4. In one embodiment, the mobile electronic device 600 includes a charger integrated circuit (IC) 625 coupled between the metal rechargeable battery 630 and the microprocessor 620. The charger IC 625 is configured to cooperate with the microprocessor 620 to charge the metal rechargeable battery and to provide safety and notification features such as battery-in-place, charger present, end-of-charge, over voltage, and charge time-out. The charger IC 625 may be independently programmable to provide, for example, precharge, fast-charge and termination charging.

In at least some embodiments, the metal rechargeable batteries 630 is one of a plurality of metal rechargeable batteries (all of which are represented in FIG. 6 by block 630) contained within the mobile electronic device 600. In some embodiments, the mobile electronic device 600 further includes a sensor network 650 associated with metal rechargeable batteries 630. In at least some embodiments each one of the plurality of metal rechargeable batteries will have its own sensor that indicates certain behavioral parameters of the metal rechargeable battery. For example, the sensors may indicate existing voltage levels as well as the ongoing charge and discharge states. In those cases, it may be advantageous to include along with the sensor network a finite state machine such as a voltage control unit 660 that knows the behavior of the batteries and responds accordingly. A voltage control unit may be able to compensate for short circuits or other problems in any particular cells. A temperature sensor 670 associated with metal rechargeable batteries 630 may also be included in order to sense temperature (or other safety-related parameters). In certain embodiments, the mobile electronic device 600 further includes one or more of: a memory 640, a display 681, antenna/radio frequency (RF) elements 682, a network interface 683, a data entry device 684 (e.g., a keypad or a touchscreen), a microphone 685, a camera 686, a video projector 687, a global positioning system (GPS) receiver 688, and the like.

EXAMPLE EMBODIMENTS

The following are examples of further embodiments. Examples may include subject matter such as a battery, device, method, means for performing acts of the method, or of at least one machine-readable medium including instructions that, when performed by a machine cause the machine to perform acts of the method according to the embodiments and examples described herein.

Example 1 is a battery cell including a first current collector, a cathode in electrical contact with the first current collector, and a second current collector. The second current collector includes a metal foam comprising a porous structure, and an electrically insulating layer on outer surfaces of the porous structure facing the cathode. The electrically insulating layer is configured to isolate the outer surfaces facing the cathode from ions provided by the cathode. The electrically insulating layer is configured to allow an electrolyte to transport ions from the cathode to an inner portion of the porous structure of the metal foam.

Example 2 includes the battery cell of Example 1, and further includes a separator to separate the cathode and the first current collector from the second current collector. The separator to allow the passage of the ions and to prevent the flow of electrons during charge and discharge of the battery cell.

Example 3 includes the battery cell of any of Examples 1-2, wherein the cathode comprises a lithium cathode material, and wherein the ions comprise lithium ions.

Example 4 includes the battery cell of Example 3, wherein when the battery cell is in at least a partially charged state, the lithium ions form an anode comprising a lithium metal plating within the inner porous structure of the metal foam.

Example 5 includes the battery cell of Example 3, wherein the lithium cathode material comprises lithium cobalt oxide, lithium nickel oxide, lithium manganese oxide, lithium iron phosphate, lithium titanium oxide or a mixture of some of these chemistries.

Example 6 includes the battery cell of any of Examples 1-5, wherein the first current collector comprises a cathode current collector, and wherein the second current collector comprises an anode current collector.

Example 7 includes the battery cell of Example 6, wherein the cathode current collector comprises aluminum, and wherein the metal foam of the anode current collector comprises at least one of a porous copper and a sponge-shaped copper.

Example 8 includes the battery cell of any of Examples 1-7, wherein the second current collector comprises a center electrode of the battery cell with the cathode comprising a first lithium cathode on a first side of the second current collector, the battery cell further comprising a second lithium cathode on a second side of the second current collector, and wherein the second lithium cathode is in electrical contact with a third current collector.

Example 9 is a method for manufacturing a lithium-ion battery. The method includes providing an electrically conductive foam comprising a porous structure, electrically insulating outer surfaces of the electrically conductive foam facing a lithium cathode material so as to allow lithium ions to enter the porous structure without interacting with the outer surfaces, forming a cathode current collector in electrical contact with the lithium cathode material, and providing an electrical connection to the electrically conductive foam as an anode current collector.

Example 10 includes the method of Example 9, and further includes providing a separator to separate the cathode and the cathode current collector from the electrically conductive foam.

Example 11 includes the method of Example 10, wherein electrically insulating the outer surfaces of the electrically conductive foam comprises forming an electrically insulating layer over the outer surfaces of the electrically conductive foam facing the lithium cathode material, and attaching the electrically insulating layer to the separator.

Example 12 includes the method of Example 10, wherein electrically insulating the outer surface of the electrically conductive foam comprises forming an electrically insulating layer on the separator, and attaching the electrically insulating layer to outer surface of the electrically conductive foam.

Example 13 includes the method of any of Examples 9-12, wherein providing the electrically conductive foam comprises selecting a material from a group comprising a porous copper and a sponge-shaped copper.

Example 14 includes the method of any of Examples 9-12, and further comprising charging the lithium-ion battery through the cathode current collector and the anode current collector to grow a lithium metal within the porous structure of the electrically conductive foam.

Example 15 is a mobile electronic device including a microprocessor and a metal rechargeable battery. The metal rechargeable battery includes a cathode current collector, a cathode in electrical contact with the cathode current collector, and an anode current collector. The cathode is configured to provide ions through a separator to the anode current collector. The anode current collector includes a metal foam comprising a porous structure, and an electrically insulating layer on outer surfaces of the porous structure facing the cathode. The electrically insulating layer isolates the outer surfaces facing the cathode from ions provided by the cathode. The electrically insulating layer is configured to allow an electrolyte to transport ions to an inner portion of the porous structure of the metal foam.

Example 16 includes the mobile electronic device of Example 15, further comprising one or more devices selected from a group comprising a memory device, a display device, a data entry device, a microphone, a camera, an antenna, a receiver, and a sensor.

Example 17 includes the mobile electronic device of any of Examples 15-16, wherein when the metal rechargeable battery is in at least a partially charged state, the ions form an anode comprising a metal plating within the inner portion of the porous structure of the metal foam.

Example 18 includes the mobile electronic device of any of Examples 15-16, wherein the cathode comprises lithium cobalt oxide, lithium nickel oxide, lithium manganese oxide, lithium iron phosphate, lithium titanium oxide or a mixture of some of these chemistries.

Example 19 includes the mobile electronic device of any of Examples 15-16, wherein the cathode current collector comprises aluminum, and wherein the metal foam comprises at least one of a porous copper and a sponge-shaped copper.

Example 20 includes the mobile electronic device of any of Examples 15-16, wherein the anode current collector comprises a center electrode of the metal rechargeable battery with the cathode comprising a first cathode on a first side of the anode current collector. The metal rechargeable battery further comprises a second cathode on a second side of the anode current collector. The second cathode is in electrical contact with a second cathode current collector.

Example 21 is a battery comprising means for producing ions and means for forming an anode during charging of the battery. The means for forming an anode includes a metal foam and an electrically insulating layer on an outer surface of the metal foam.

Example 22 includes the battery of Example 21, further comprising means to separate the means for producing ions from the means for forming an anode during charging of the battery.

Example 23 includes the battery any of Examples 21-22, wherein the means for producing ions comprises a lithium cathode material, and wherein the ions comprise lithium ions.

Example 24 includes the battery Example 23, wherein when the battery is in at least a partially charged state, the lithium ions form an anode comprising a lithium metal plating within the inner porous structure of the metal foam.

Example 25 includes the battery Example 23, wherein the lithium cathode material comprises lithium cobalt oxide, lithium nickel oxide, lithium manganese oxide, lithium iron phosphate, lithium titanium oxide or a mixture of some of these chemistries.

Example 26 includes at least one computer-readable storage medium having stored thereon computer-readable instructions, when executed, to implement a method. The method includes providing an electrically conductive foam comprising a porous structure, electrically insulating outer surfaces of the electrically conductive foam facing a cathode material so as to allow ions to enter the porous structure without interacting with the outer surfaces, forming a cathode current collector in electrical contact with the cathode material, and providing an electrical connection to the electrically conductive foam as an anode current collector.

Example 27 includes the at least one computer-readable storage medium of Example 26, the method further comprising providing a separator to separate the cathode and the cathode current collector from the electrically conductive foam.

Example 28 includes the at least one computer-readable storage medium of Example 27, wherein electrically insulating the outer surfaces of the electrically conductive foam comprises forming an electrically insulating layer over the outer surfaces of the electrically conductive foam facing the cathode material, and attaching the electrically insulating layer to the separator.

Example 29 includes the at least one computer-readable storage medium of Example 27, wherein electrically insulating the outer surface of the electrically conductive foam comprises forming an electrically insulating layer on the separator, and attaching the electrically insulating layer to outer surface of the electrically conductive foam.

Example 30 includes the includes the at least one computer-readable storage medium of any of Examples 26-29, wherein providing the electrically conductive foam comprises selecting a material from a group comprising a porous copper and a sponge-shaped copper.

Example 31 includes the at least one computer-readable storage medium of any of Examples 26-30, the method further comprising charging through the cathode current collector and the anode current collector to grow a lithium metal within the porous structure of the electrically conductive foam.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art. The scope of the present invention should, therefore, be determined only by the following claims.

The invention claimed is:

1. A battery cell, comprising:
a first current collector;
a second current collector;
a first cathode in electrical contact with the first current collector;
a second cathode in electrical contact with the second current collector; and
a third current collector including:
a metal foam comprising a porous structure; and
an electrically insulating layer on outer surfaces of the porous structure facing the first cathode and the second cathode, the electrically insulating layer to isolate the outer surfaces facing the first cathode and the second cathode from ions provided by the first cathode and the second cathode, and wherein the electrically insulating layer is configured to allow an electrolyte to transport ions from the first cathode and the second cathode to an inner portion of the porous structure of the metal foam.

2. The battery cell of claim 1, further comprising a separator to separate the first cathode and the first current collector from the third current collector, the separator to allow the passage of the ions and to prevent the flow of electrons during charge and discharge of the battery cell.

3. The battery cell of claim 1, wherein the first or the second cathode comprises a lithium cathode material, and wherein the ions comprise lithium ions.

4. The battery cell of claim 3, wherein when the battery cell is in at least a partially charged state, the lithium ions form an anode comprising a lithium metal plating within the inner portion of the porous structure of the metal foam.

5. The battery cell of claim 3, wherein the lithium cathode material comprises lithium cobalt oxide, lithium nickel oxide, lithium manganese oxide, lithium iron phosphate, lithium titanium oxide or a mixture of some of these compounds.

6. The battery cell of claim 1, wherein the first current collector comprises a cathode current collector, and wherein the third current collector comprises an anode current collector.

7. The battery cell of claim 6, wherein the cathode current collector comprises aluminum, and wherein the metal foam of the anode current collector comprises at least one of a porous copper and a sponge-shaped copper.

8. A method for manufacturing a lithium-ion battery, the method comprising:
providing an electrically conductive foam comprising a porous structure;
electrically insulating outer surfaces of the electrically conductive foam facing a first lithium cathode material on a first side and a second lithium cathode material on a second side so as to allow lithium ions to enter the porous structure without interacting with the outer surfaces;
forming a first cathode current collector in electrical contact with the first lithium cathode material;
forming a second cathode current collector in electrical contact with the second lithium cathode material; and
providing an electrical connection to the electrically conductive foam as an anode current collector.

9. The method of claim 8, further comprising providing a separator to separate the first lithium cathode material and the first cathode current collector from the electrically conductive foam.

10. The method of claim 9, wherein electrically insulating the outer surfaces of the electrically conductive foam comprises:
forming an electrically insulating layer over the outer surfaces of the electrically conductive foam facing the first lithium cathode material; and
attaching the electrically insulating layer to the separator.

11. The method of claim 9, wherein electrically insulating the outer surface of the electrically conductive foam comprises:
forming an electrically insulating layer on the separator; and attaching the electrically insulating layer to outer surface of the electrically conductive foam.

12. The method of claim 8, wherein providing the electrically conductive foam comprises selecting a material from a group comprising a porous copper and a sponge-shaped copper.

13. The method of claim 8, further comprising charging the lithium-ion battery through the first cathode current collector and the anode current collector to grow a lithium metal within the porous structure of the electrically conductive foam.

14. A mobile electronic device, comprising:
a microprocessor; and
a metal rechargeable battery comprising:
a first cathode current collector;
a second cathode current collector;
a first cathode in electrical contact with the first cathode current collector and configured to provide ions through a separator to an anode current collector;
a second cathode in electrical contact with the second cathode current collector and configured to provide ions through a separator to the anode current collector; and
the anode current collector comprising:
a metal foam comprising a porous structure; and
an electrically insulating layer on outer surfaces of the porous structure facing the first cathode on a first side of the anode current collector and the second cathode on a second side of the anode current collector, the electrically insulating layer to isolate the outer surfaces facing the first cathode and the second cathode from ions provided by the first cathode and the second cathode, and wherein the electrically insulating layer is configured to allow an electrolyte to transport ions to an inner portion of the porous structure of the metal foam.

15. The mobile electronic device of claim 14, further comprising one or more devices selected from a group comprising a memory device, a display device, a data entry device, a microphone, a camera, an antenna, a receiver, and a sensor.

16. The mobile electronic device of claim 14, wherein when the metal rechargeable battery is in at least a partially charged state, the ions form an anode comprising a metal plating within the inner portion of the porous structure of the metal foam.

17. The mobile electronic device of claim 14, wherein the first or second cathode comprises lithium cobalt oxide, lithium nickel oxide, lithium manganese oxide, lithium iron phosphate, lithium titanium oxide or a mixture of some of these chemistries.

18. The mobile electronic device of claim 14, wherein the first or second cathode current collector comprises aluminum, and wherein the metal foam comprises at least one of a porous copper and a sponge-shaped copper.

* * * * *